United States Patent Office 3,033,821
Patented May 8, 1962

3,033,821
PRODUCTION OF DIGLYCIDYL ETHERS
Herbert P. Price and William J. Belanger, Louisville, Ky., assignors to Devoe & Raynolds Company, Inc., Louisville, Ky., a corporation of New York
No Drawing. Filed Oct. 24, 1958, Ser. No. 769,317
11 Claims. (Cl. 260—47)

This invention relates to the production of new aliphatic-aromatic glycidyl ethers. It includes a new process of producing such ethers and the resulting ethers produced thereby.

According to the present invention, monochlorohydrin ethers of hydroxyalkyl and hydroxy-aliphatic ethers of dihydric phenols are subjected to dehydrohalogenation with an alkaline dehydrohalogenating agent, in the presence of an excess of epichlorohydrin as a solvent and reaction medium, to produce mainly or largely monomeric aliphatic-aromatic diglycidyl ethers.

The hydroxyalkyl or hydroxy-aliphatic ethers of dihydric phenols, from which the chlorohydrin ethers are prepared, can be readily prepared by reacting 1 mol of dihydric phenol with 1 mol of a simple or substituted alkyl or aliphatic chlorohydrin, using sodium hydroxide as the condensing or dehydrohalogenating agent; or by reacting 1 mol of dihydric phenol with 1 mol of a simple or substituted alkyl or aliphatic carbonate using potas-carbonate as the catalyst; or by reacting 1 mol of dihydric phenol with 1 mol of a simple or substituted aliphatic monoepoxide.

The formation of the hydroxyalkyl or hydroxy-aliphatic ethers of a dihydric phenol is illustrated by the following equation, in which R is the aromatic nucleus of the dihydric phenol and R' is the radical of the simple or substituted alkyl group, including alkylether substituted alkyl groups, and which may be defined as a simple or substituted aliphatic divalent radical containing at least 2 carbon atoms selected from the group consisting of aliphatic hydrocarbon groups, hydroxy-substituted aliphatic hydrocarbon groups, hydrocarbon ether-substituted aliphatic hydrocarbon groups, and hydroxy-substituted hydrocarbon ethers of aliphatic hydrocarbon groups:

$$\text{HO—R—OH} + \text{ClR'OH} \xrightarrow{\text{NaOH}} \text{HO—R—O—R'OH} + \text{NaCl}$$

Examples of the hydroxyalkyl ethers are the hydroxyethyl ether of the dihydric phenol, such as bisphenol, in which R' is the —CH$_2$CH$_2$— group, which can readily be prepared by the reaction of ethylene chlorohydrin with a dihydric phenol with the use of caustic soda as the dehydrohalogenating agent. The use of glyceryl monochlorohydrin gives a hydroxy alkylether in which R' is the

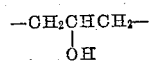

group, this being the dihydroxypropyl ether of the dihydric phenol.

In a similar manner, the use of other aliphatic chlorohydrins can be used to give other hydroxyalkyl or substituted hydroxyalkyl ethers of the dihydric phenols.

The dihydroxypropyl ether of the dihydric phenol can also be prepared by reacting 1 mol of the dihydric phenol with 1 mol of glycidol. And other monoepoxides can be similarly used to produce other hydroxyalkyl and substituted hydroxyalkyl derivatives. Thus, the use of phenylglycide ether for reacting with the dihydric phenol gives a product in which the group R' in the above formula is

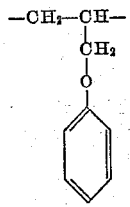

In this case, the alkyl group has a hydrocarbon ether substituent. Other simple or substituted hydroxyalkyl derivatives can be produced by the use of other mono-epoxides such as ethylene oxide, butylglycidyl ether, isopropylglycidyl ether, styrene oxide, etc.

In addition to the simple and substituted hydroxyalkyl ethers, substituted in the alkyl group, somewhat more complex hydroxyalkyl or hydroxy-aliphatic derivatives of the dihydric phenols can be produced by reacting 1 mol of the dihydric phenol with the monochlorohydrin ether of a mono-, di-, or trihydric alcohol, or by reacting 1 mol of the dihydric phenol with 1 mol of a monoglycide ether such as the monoglycide ethers of di-, tri-, or higher polyhydric alcohols. For example, 1 mol of the mono-glycide ether of trimethylol propane can be reacted with 1 mol of a dihydric phenol such as bisphenol to form the corresponding hydroxy-containing monoether. Or 1 mol of the monochlorohydrin ether of trimethylol propane can be reacted with 1 mol of a dihydric phenol such as bisphenol to form the hydroxy-containing monoether. The resulting hydroxyalkyl or hydroxy-aliphatic ether of the dihydric phenol in this case will have a formula in which R' is the following group:

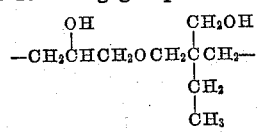

The hydroxyalkyl or hydroxy-aliphatic ethers of the dihydric phenols have both alcoholic hydroxyl and phenolic hydroxyl groups.

The monochlorohydrin ethers are produced by reacting 1 mol of the hydroxyalkyl ether or of the hydroxy-aliphatic ether of the dihydric phenol with 1 mol of epichlorohydrin in the presence of a condensation catalyst, and particularly a BF$_3$ catalyst such as a boron trifluoride ether complex or etherate, to form the chlorohydrin ether. This reaction of epichlorohydrin is with the alcoholic hydroxyl group, or with one of the alcoholic hydroxyl groups, leaving the phenolic hydroxyl group largely unreacted. This reaction is illustrated by the following equation, in which R and R' have the same meaning above indicated:

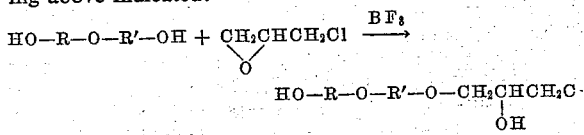

The further reaction of the chlorohydrin ether with epichlorohydrin, in the presence of an alkaline dehydro-halogenating agent, is one in which the phenolic hydroxyl reacts with the epichlorohydrin at the same time that the chlorohydrin group of the chlorohydrin ether is dehydrohalogenated, with the resulting production mainly of a monomeric diglycidyl ether, as illustrated by the following equation:

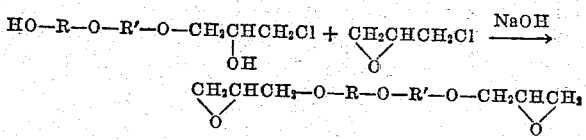

The hydroxyalkyl and hydroxy-aliphatic ethers of dihydric phenols have both an alcoholic hydroxyl group and a phenolic hydroxyl group. The reaction of the epichlorohydrin with the aid of a $BF_3$ catalyst is with the alcoholic hydroxyl group, while the subsequent reaction of epichlorohydrin in the presence of caustic alkali is with the phenolic hydroxyl group. There is thus produced a diglycidyl aliphatic-aromatic ether with one glycidyl ether group united to the aromatic residue of the phenol, and the other united to the alkyl or aliphatic ether group.

Thus, if the process is considered as starting with the hydroxyalkyl ether of the dihydric phenol, the first step is one of reaction with epichlorohydrin with the use of a condensation catalyst and particularly the use of a $BF_3$ catalyst such as a boron trifluoride ether complex or etherate. This reaction is an addition reaction between the epoxy group of the epichlorohydrin and the alcoholic hydroxyl group of the hydroxyalkyl ether of the dihydric phenol. In this reaction, no excess of epichlorohydrin is necessary and all or substantially all of the epichlorohydrin initially added is caused to react with the alcoholic hydroxyl group.

After the formation of the monochlorohydrin ether of the hydroxyalkyl ether of the dihydric phenol, the boron fluoride catalyst is killed or deactivated by the use of minute amounts of alakli and water.

In carrying out the main step of the process, in which the above monochlorohydrin ether is reacted with epichlorohydrin in the presence of an alkaline dehydrohalogenating agent, a considerable excess of epichlorohydrin is used and acts as a solvent and reaction medium, part of this epichlorohydrin reacting with the phenolic hydroxyl to form the glycidyl ether group. The excess of epichlorohydrin used in this step is at least 1 mol of epichlorohydrin for each mol of the chlorohydrin ether used and of the epichlorohydrin which reacts; and advantageously a much larger proportion of epichlorohydrin is used, e.g., up to around 6 to 10 or even 20 mols of epichlorohydrin.

In carrying out the dehydrohalogenating step of the process, there is added to the mixture of chlorohydrin ether and epichlorohydrin a dehydrohalogenating agent, advantageously caustic alkali. The amount of alkali used is based on the chlorohydrin ether and on the epichlorohydrin which will react with the phenolic hydroxyl, and advantageously with a small excess. The excess epichlorohydrin added and present during the dehydrohalogenation acts as a solvent or diluent or reaction medium and does not enter into the reaction to any notable extent.

It is one advantage of the use of an excess of epichlorohydrin during the dehydrohalogenation that it enables the diglycide ethers to be produced largely in a monomeric state and with a minimum or limited amount of further reaction or condensation or polymerization during the dehydrohalogenation.

Different alkaline dehydrohalogenating agents can be used, including alkali metal complexes and salts such as sodium silicate, sodium aluminate, sodium zincate, etc. It is one advantage of the process, in which epichlorohydrin is used as a solvent or diluent, that caustic alkali can be used for the dehydrohalogenation without objectionable further reaction, or with a minimum of further reaction during and after the formation of the diglycidyl ethers.

Different unsubstituted and substituted hydroxyalkyl ethers of dihydric phenols can be used in making the monochlorohydrin ethers and the final diglycidyl ethers, varying both in the dihydric phenol used and in the hydroxylalkyl or hydroxy-aliphatic ether groups, as previously indicated. The hydroxyethyl ethers of dihydric phenols, such as bisphenol, are particularly advantageous; but higher mono- or polyhydroxylalkyl ethers can be used, such as the hydroxypropyl and hydroxyl butyl ethers, and including substituted as well as unsubstituted hydroxalkyl and hydroxy-aliphatic ethers.

Different dihydric phenols can be used in the hydroxyalkyl and hydroxy-aliphatic ethers, including dihydric phenols such as are used with epichlorohydrin in the presence of caustic alkali for producing epoxy resins, including resorcinol, hydroquinone, bisphenol (p,p'-dihydroxy diphenyl dimethyl methane) etc.

In the chlorohydrin ethers which are formed in the manner above described, most of the chlorine is active chlorine, while some small amount of the chlorine may be present as inactive chlorine. These terms, as used in the following examples, are defined as follows:

The active chlorine is defined as the chlorine on a carbon atom adjacent to a carbon atom containing a hydroxyl group, as follows:

(1) 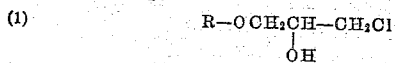

This compound is easily dehydrohalogenated to give an epoxide compound.

Inactive chlorines are formed by the addition of epichlorohydrin to the hydroxyl group in the above compound.

(2) 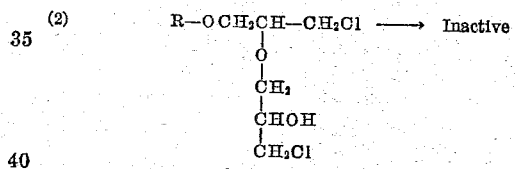

The above labeled chlorine cannot be removed to form an epoxide group since no hydroxyl is present on an adjacent carbon.

The invention will be further illustrated by the following examples and more detailed description, but it will be understood that the invention is not limited thereto.

Examples 1 and 2 illustrate the production of the monohydroxyethyl ether of bisphenol by two different processes.

Example 1

To a five liter flask equipped with a condenser, stirrer, and thermometer, was added 1140 grams (5 mols) of bisphenol, 210 grams sodium hydroxide (5 mols+5 wt. percent excess) and 1.5 liters of water. After the bisphenol and sodium hydroxide were dissolved, 407.5 grams (5 mols+1.35 wt. percent excess) of ethylene chlorohydrin was added. The solution was heated to reflux and held there for one hour. On cooling, the product was washed with hot water until neutral to remove the sodium chloride and other water solubles. The water was then removed by heating the material to 160° C. under 29 mm. pressure. The product analyzed 12.55% OH (theoretical 12.5%) in 100% yield (1367 grams).

Example 2

To the same equipment as decribed in Example 1, 228 grams bisphenol (1 mol) and 93 grams of ethylene carbonate (1 mol+5 wt. percent excess) were added. The mixture was heated to 130° C. to dissolve the bisphenol. Potassium carbonate, 2 grams, was added. The temperature was raised over a period of two hours to 200° C. The product was cooled and reheated to 150° C. under 70 mm. pressure. The product analyzed 12.65% OH in 100% yield (274 grams).

The compounds of Examples 1 and 2 were dark amber colored amorphous materials that were viscous liquids at room temperature.

The hydroxyethyl ethers of resorcinol are prepared in a similar manner and are dark, viscous, amorphous liquids at room temperature.

The hydroxyethyl ethers of other dihydric phenols such as hydroquinone, 4,4'-dihydroxy diphenyl sulfone, etc. may be similarly prepared.

Other hydroxyalkyl ethers of dihydric phenols are illustrated by the following examples:

*Example 3*

To a two liter flask equipped with a mechanical stirrer, thermometer and condenser was added three moles of bisphenol (684 grams), three moles of isopropyl glycidyl ether (348 grams) and one gram of $K_2CO_3$. Heat was applied and the temperature was slowly raised to 150° C. over a period of one hour. When the heat source was removed, the temperature rose to 170° C. in 15 minutes. At this point, the temperature began to fall so heat was applied to 200° C. in thirty minutes. The material was then poured into a can to cool. The product in 100% yield analyzed at 9.9% hydroxyl (theoretical percent OH=9.9).

*Example 4*

To a two liter flask equipped as in Example 3 was added five moles of resorcinol (550 grams), and five mols of glycerine carbonate (590 grams). The mixture was heated to 130° C. where two grams $K_2CO_3$ was added. The temperature was raised to 190–200° C. and held there for three hours. At the end of this time, gas evolution was very small. The apparatus was then evacuated to 150 mm. pressure and held at this pressure and 190–200° C. for two hours. The product in 99% yield (912 grams) contained 27.0% OH (theoretical, 27.7%).

The reaction of the hydroxyalkyl ethers of dihydric phenols with epichlorohydrin in the presence of a $BF_3$ catalyst to form the monochlorohydrin derivative, and the subsequent further reaction with epichlorohydrin in the presence of an alkaline dehydrohalogenating agent and an excess of epichlorohydrin, is illustrated by the following examples:

*Example 5*

To a two liter flask equipped with a thermometer, stirrer, condenser and dropping funnel was added 384 grams (1.41 mols based on percent OH=12.55) of the hydroxyethyl ether of bisphenol and 20 grams of epichlorohydrin. The mixture was heated to 55° C. and 1 cc. of $BF_3$ etherate (47% $BF_3$) was added. The material exothermed to 63° C. and was cooled by application of an external water bath to 57° C. The remaining epichlorohydrin (total 131 grams, 1.41 mols) was added over a period of one hour. The temperature was held between 55–60° C. during this addition by controlling the rate of epichlorohydrin addition and by cooling. After all the epichlorohydrin was added, the temperature was raised to 80° C. where 5 cc. of water was added to complex the catalyst. This material analyzed 7.6% active chlorine, 9.8% total chlorine.

To this compound was added 1170 grams epichlorohydrin (ratio of total epichlorohydrin to dihydric compound being 10 to 1). Sodium hydroxide (112 grams, 20 wt. percent excess) was added in three portions over a 45 minute period. After each addition the exotherm was kept under 97° C. by cooling. After the sodium hydroxide addition was completed, the water-epichlorohydrin azeotrope was distilled to a pot temperature of 125° C.

The batch was filtered to remove the salts and the filtrate was distilled to 160° C. under 50 mm. pressure. The resin analyzed as containing a weight/epoxide of 276, total chlorine 6.5%, active chlorine 1.9%, Gardner-Holdt viscosity $Z_3$, Brookfield viscosity 5,000 cps. in a yield of 117% (637 grams).

*Example 6*

To a one liter flask equipped with condenser, stirrer, thermometer and addition tube was added 408 grams of the hydroxyethyl ether of bisphenol (1.5 mols) and 1 cc. of $BF_3$ etherate. The temperature was raised to 43° C. where dropwise addition of epichlorohydrin was begun. The epichlorohydrin (139 grams, 1.5 mols) was added over a period of forty minutes, the temperature being controlled between 70–80° C. by external cooling. The product contained 8.0% active chlorine, 9.8% total chlorine.

One mol of this chlorohydrin ether (364.5 grams) was weighed into a two liter flask equipped with stirrer, condenser, and thermometer. One gram of NaOH dissolved in 5 cc. $H_2O$ was added to complex the catalyst. Epichlorohydrin (833 grams, 9 mols) was added and after solution NaOH (88 grams, 2 mols+10 wt. percent excess) was added in three portions. After each addition, the exotherm was controlled below 100° C. by external cooling. After the final exotherm, the temperature was raised to 95° C. The water, epichlorohydrin azeotrope was removed to a pot temperature of 1260° C. The material upon cooling was filtered to remove the salts, and the salt cake was washed with benzene. The filtrate was distilled to 160° C. at 72 mm. The product recovered in 103% yield (397 grams) had a weight/epoxide of 247, active chlorine of 1%, total chlorine of 3.4% and a Gardner-Holdt viscosity of $Z_3$.

*Example 7*

By a similar procedure, the hydroxyethyl ether of resorcinol was converted into a chlorohydrin ether containing 12.0% active chlorine and 14.4% total chlorine and, on reaction and dehydrohalogenation with the presence of excess epichlorohydrin, gave a diglycidyl ether having a weight/epoxide of 196 (theoretical 133), containing active chlorine of 1.5% and total chlorine of 5.0%, and a Gardner-Holdt viscosity of V–W.

*Example 8*

The isopropyl glycidyl ether adduct of bisphenol of Example 3, when converted to the chlorohydrin ether in a similar way, gave a chlorohydrin ether containing 6.5% active chlorine and 8.1% total chlorine. On dehydrohalogenation in the presence of excess epichlorohydrin, the resulting diglycidyl ether had a weight/epoxide of 290 (theoretical 228), contained 0.6% active chlorine and 2.4% total chlorine, and showed a Gardner-Holdt viscosity of $Z_3$–$Z_4$.

*Example 9*

The glycerine ether of resorcinol, prepared as in Example 4, when treated in a similar way, gave a chlorohydrin ether with 11.1% active chlorine and 12.8% total chlorine. And when this was converted to the diglycidyl ether, the resulting product had a weight/epoxide of 187 (theoretical 148), contained 0.8% active chlorine and 3.8% total chlorine, and had a Gardner-Holdt viscosity of $Z_4$.

In a similar manner, other hydroxyalkyl and hydroxyaliphatic ethers of dihydric phenols, such as those hereinbefore referred to and illustrated by the general formula hereinbefore given, can be prepared and reacted with epichlorohydrin to give first the monochlorohydrin ethers and then, by dehydrohalogenation with the addition of an excess of epichlorohydrin, giving the diglycide ethers with the glycidyl group at one end of the molecule united to the phenolic residue and the glycidyl group at the other end of the molecule united to an aliphatic residue, as illustrated by the general formula hereinbefore given.

The diglycidyl ethers of the present invention are distinguished from diglycidyl ethers of dihydric phenols in that they contain the glycidyl groups joined to both aliphatic and aromatic groups, and have a composite aliphatic-aromatic grouping between the terminal glycidyl groups.

The new diglycidyl ethers of the present invention are valuable epoxide resins which can be cured with amine catalysts and other curing agents. They can thus be cured with amines such as diethylene triamine or other curing or cross-linking agents. Using amines such as diethylene triamine or metaphenylene diamine, the resins can be cured e.g. with amounts equivalent to the epoxide content of the resin or with smaller amounts. These resins can be used for purposes for which epoxide resins made from dihydric phenols and epichlorohydrin are useful.

The new products have the advantage, when cured, of incorporating aliphatic as well as aromatic constituents, and, for many purposes, are more advantageously useful for this reason.

We claim:

1. The method of producing aliphatic-aromatic diglycidyl ethers which comprises subjecting an hydroxyalkyl ether of a dihydric phenol, said ether containing a phenolic hydroxyl group, having at least 2 carbon atoms in the alkyl group to reaction with epichlorohydrin in admixture with a condensation catalyst to produce the monochlorohydrin ether of the hydroxyalkyl ether of the dihydric phenol, and subjecting the monochlorohydrin ether to dehydrohalogenation in admixture with an excess of epichlorohydrin and an alkaline dehydrohalogenating agent in amount sufficient to dehydrohalogenate the chlorohydrin and to effect reaction of part of the epichlorohydrin with the phenolic hydroxyl of the chlorohydrin ether, said excess of epichlorohydrin being in an amount equivalent to at least one mole of epichlorohydrin for each mole of monochlorohydrin ether used and for each mole of epichlorohydrin which reacts with the phenolic hydroxyl group of said monochlorohydrin ether.

2. The method of producing aliphatic-aromatic diglycidyl ethers which comprises subjecting hydroxy-aliphatic ethers of a dihydric phenol having the following general formula:

$$\text{HO—R—O—R'—OH}$$

in which R is the aromatic nucleus of a dihydric phenol and R' is a divalent radical containing at least 2 carbon atoms selected from the group consisting of aliphatic hydrocarbon groups, hydroxy-substituted aliphatic hydrocarbon groups, hydrocarbon ether-substituted aliphatic hydrocarbon groups and hydroxy-substituted hydrocarbon ethers of aliphatic hydrocarbon groups, to reaction with epichlorohydrin in admixture with a condensation catalyst to produce the monochlorohydrin ether of the hydroxy-aliphatic ether of the dihydric phenol, and subjecting the monochlorohydrin ether to dehydrohalogenation in admixture with an excess of epichlorohydrin and an alkaline dehydrohalogenating agent in amount sufficient to dehydrohalogenate the chlorohydrin and to effect reaction of part of the epichlorohydrin with the phenolic hydroxyl of the chlorohydrin ether, said excess of epichlorohydrin being in an amount equivalent to at least one mole of epichlorohydrin for each mole of monochlorohydrin ether used and for each mole of epichlorohydrin which reacts with the phenolic hydroxyl group of said monochlorohydrin ether.

3. The method of producing aliphatic-aromatic diglycidyl ethers which comprises subjecting a monohydroxyethyl ether of a dihydric phenol, said ether containing a phenolic hydroxyl group, to reaction with epichlorohydrin in admixture with a condensation catalyst to produce the monochlorohydrin ether of the hydroxyethyl ether of the dihydric phenol, and subjecting the monochlorohydrin ether to dehydrohalogenation in admixture with an excess of epichlorohydrin and an alkaline dehydrohalogenating agent in amount sufficient to dehydrohalogenate the chlorohydrin and to effect reaction of part of the epichlorohydrin with the phenolic hydroxyl of the chlorohydrin ether, said excess of epichlorohydrin being in an amount equivalent to at least one mole of epichlorohydrin for each mole of monochlorohydrin ether used and for each mole of epichlorohydrin which reacts with the phenolic hydroxyl group of said monochlorohydrin ether.

4. The method of producing aliphatic-aromatic diglycidyl ethers which comprises subjecting a dihydroxypropyl ether of a dihydric phenol, said ether containing a phenolic hydroxyl group, to reaction with epichlorohydrin in admixture with a condensation catalyst to produce the monochlorohydrin ether of the dihydroxypropyl ether of the dihydric phenol, and subjecting the monochlorohydrin ether to dehydrohalogenation in admixture with an excess of epichlorohydrin and an alkaline dehydrohalogenating agent in amount sufficient to dehydrohalogenate the chlorohydrin and to effect reaction of part of the epichlorohydrin with the phenolic hydroxyl of the chlorohydrin ether.

5. The method of producing diglycidyl ethers from monochlorohydrin ethers of hydroxyalkyl ethers of dihydric phenols, said hydroxyalkyl ethers containing phenolic hydroxyl groups; which comprises admixing such ethers with an excess of epichlorohydrin and subjecting the mixture to dehydrohalogenation with an alkaline dehydrohalogenating agent in amount sufficient to dehydrohalogenate the chlorohydrin ether and cause reaction of part of the epichlorohydrin with the phenolic hydroxyl of said ether, said excess of epichlorohydrin being in an amount equivalent to at least one mole of epichlorohydrin for each mole of monochlorohydrin ether used and for each mole of epichlorohydrin which reacts with the phenolic hydroxyl group of said monochlorohydrin ether.

6. The method of producing diglycidyl ethers from monochlorohydrin ethers of hydroxy-aliphatic ethers of a dihydric phenol having the following general formula $$\text{H—O—R—O—R'—O—CH}_2\text{CHCH}_2\text{Cl}$$
$$\text{|}$$
$$\text{OH}$$

in which R is the aromatic nucleus of a dihydric phenol and R' is a divalent radical containing at least 2 carbon atoms selected from the group consisting of aliphatic hydrocarbon groups, hydroxy-substituted aliphatic hydrocarbon groups, hydrocarbon ether-substituted aliphatic hydrocarbon groups, and hydroxy-substituted hydrocarbon ethers of aliphatic hydrocarbon groups, which comprises admixing the said monochlorohydrin ether with an excess of epichlorohydrin and subjecting the mixture to dehydrohalogenation with an alkaline dehydrohalogenating agent in amount sufficient to dehydrohalogenate the chlorohydrin ether and cause reaction of part of the epichlorohydrin with the phenolic hydroxyl of said ether, said excess of epichlorohydrin being in an amount equivalent to at least one mole of epichlorohydrin for each mole of monochlorohydrin ether used and for each mole of epichlorohydrin which reacts with the phenolic hydroxyl group of said monochlorohydrin ether.

7. The method of producing diglycidyl ethers from the monochlorohydrin ether of the monohydroxy ethyl ether of a dihydric phenol, said monohydroxy ethyl ether containing a phenolic hydroxyl group, which comprises admixing such ether with an excess of epichlorohydrin and subjecting the mixture to dehydrohalogenation with an alkaline dehydrohalogenating agent in amount sufficient to dehydrohalogenate the chlorohydrin ether and cause reaction of part of the epichlorohydrin with the phenolic hydroxyl of said ether, said excess of epichlorohydrin being in an amount equivalent to at least one mole of epichlorohydrin for each mole of monochlorohydrin ether used and for each mole of epichlorohydrin which reacts with the phenolic hydroxyl group of said monochlorohydrin ether.

8. The method of producing diglycidyl ethers from the monochlorohydrin ether of the dihydroxypropyl ether of a dihydric phenol, said dihydroxypropyl ether containing a phenolic hydroxyl group, which comprises admixing such ether with an excess of epichlorohydrin and subjecting the mixture to dehydrohalogenation with an alkaline dehydrohalogenating agent in amount sufficient to dehydrohalogenate the chlorohydrin ether and cause reaction of part of the epichlorohydrin with the phenolic hydroxyl of said ether, said excess of epichlorohydrin being in an amount equivalent to at least one mole of epichlorohydrin for each mole of monochlorohydrin ether used and for each mole of epichlorohydrin which reacts with the phenolic hydroxyl group of said monochlorohydrin ether.

9. New aliphatic-aromatic diglycidyl ethers made up essentially of monomeric products of the following formula:

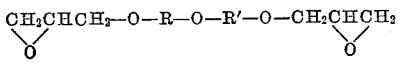

in which R is the aromatic nucleus of a dihydric phenol and R' is a divalent radical containing at least 2 carbon atoms selected from the group consisting of aliphatic hydrocarbon groups, hydroxy-substituted aliphatic hydrocarbon groups, hydrocarbon ether-substituted aliphatic hydrocarbon groups, and hydroxy-substituted hydrocarbon ethers of aliphatic hydrocarbon groups.

10. New products as defined in claim 9, in which R' is an unsubstituted aliphatic hydrocarbon radical.

11. New products as defined in claim 9 in which R' is a hydroxy-substituted aliphatic hydrocarbon group.

References Cited in the file of this patent

UNITED STATES PATENTS

| | | |
|---|---|---|
| 2,581,464 | Zech | Jan. 8, 1952 |
| 2,841,595 | Pezzaglia | July 1, 1958 |

UNITED STATES PATENT OFFICE
CERTIFICATE OF CORRECTION

Patent No. 3,033,821                        May 8, 1962

Herbert P. Price et al.

It is hereby certified that error appears in the above numbered patent requiring correction and that the said Letters Patent should read as corrected below.

Column 1, line 27, for "potas-" read -- potassium --; column 2, lines 56 to 61, the lower right-hand portion of the equation, for

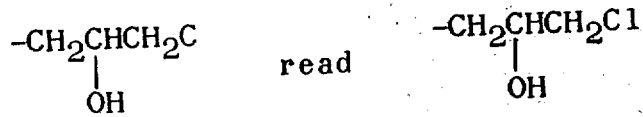

column 3, line 37, for "alakli" read -- alkali --; column 4, line 9, for "hydroxyl" read -- hydroxy --; column 6, line 22, for "1260°" read -- 126° --; column 9, line 11, for "hole" read -- mole --.

Signed and sealed this 11th day of September 1962.

(SEAL)
Attest:
ERNEST W. SWIDER
Attesting Officer

DAVID L. LADD
Commissioner of Patents